CHARLES BEAN.
Improvement in Horse Hay-Forks.

No. 114,391. Patented May 2, 1871.

Witnesses
Phil. H. Larner
Frank H. Jackson

Inventor.
Charles Bean
By Wm C. Wood
Atty.

United States Patent Office.

CHARLES BEAN, OF PAWTUCKET, RHODE ISLAND.

Letters Patent No. 114,391, dated May 2, 1871.

IMPROVEMENT IN HORSE HAY-FORKS.

The Schedule referred to in these Letters Patent and making part of the same.

*To all whom it may concern:*

Be it known that I, CHARLES BEAN, of Pawtucket, in the county of Providence and State of Rhode Island, have invented a certain new and useful Horse Hay-Fork.

My invention relates to that general class of horse hay-forks which is provided with main and auxiliary tines which, when the fork is loaded, are held in position by a spring-latch, and released by a tripping device.

My invention consists in certain novelties of construction; and I do hereby declare the following specification, taken in connection with the drawing furnished and forming a part of the same, is a clear, true, and exact description thereof.

Referring to the drawing—

A is, properly speaking, the handle of the fork. It is provided with an extension, which may be readily grasped by the operator while handling it.

The lifting-line $a$ is attached to the handle.

B is the shank of the several main tines C, which are all rigidly attached thereto.

Figure 1:
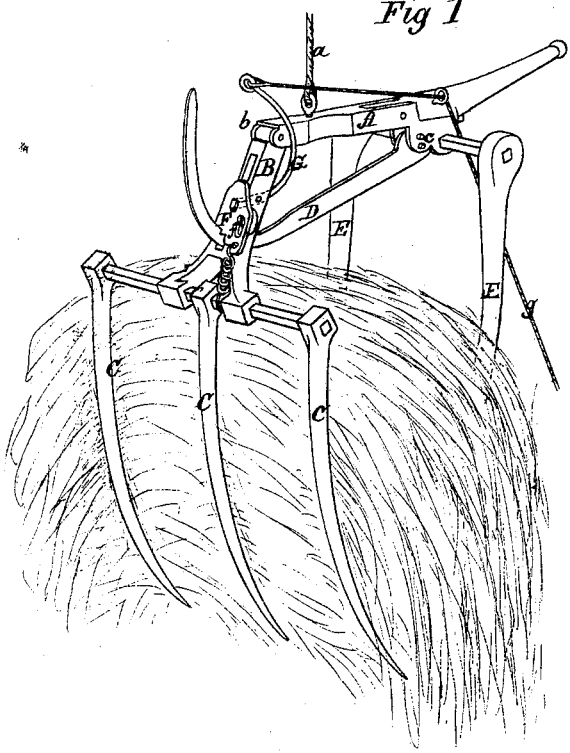
Figure 1 represents one of my improved forks loaded with hay.
Figure 2:
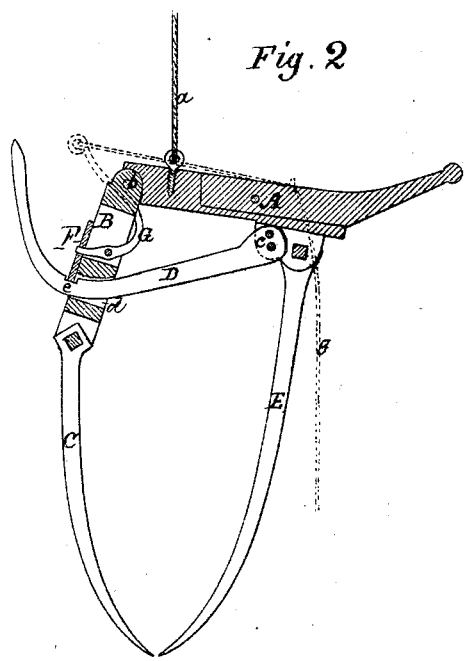
Figure 2 represents the same in longitudinal vertical section.
Figure 3:
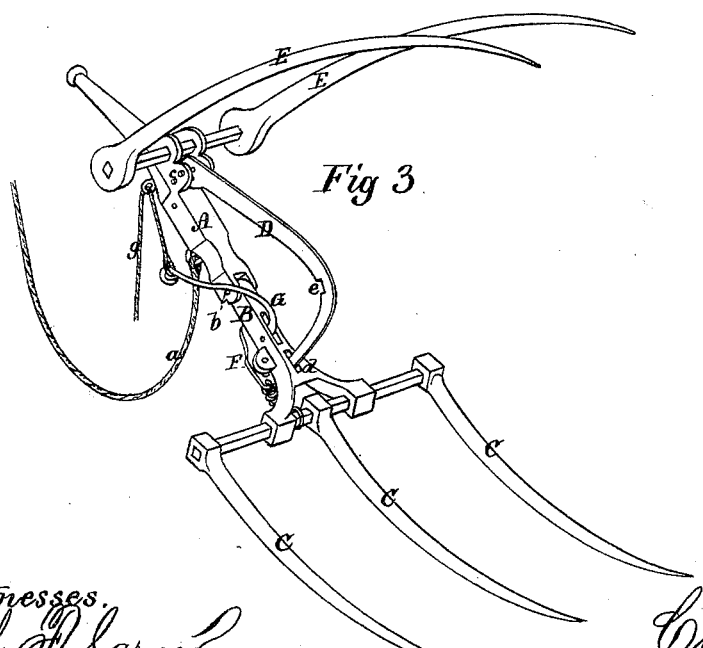
Figure 3 represents the fork ready for loading, and about to be inserted into the mass of hay to be lifted.

This shank and the handle A are connected by a hinge-joint at $b$. This joint is so constructed that while the main tines may drop freely to a position at right angles to the handle, they cannot, if the forks be turned over, pass out of a line generally parallel with the line of the handle, as shown in fig. 3.

D is a holding-bar rigidly attached at one end to the handle A at point $c$.

It extends toward the main tines through a slot, $d$, in shank B, and then is curved upward.

E are the auxiliary tines. They are rigidly attached to the handle A, and at nearly right angles to the general line thereof, curving slightly toward the main tines.

F is a spring sliding latch on the shank B, placed across the slot $d$, above and in close relation to the upper edge of the guide-bar D, which passes through the slot.

This latch, when the fork is closed, is forced by a suitable spring to enter a square-shouldered recess, $e$, in the upper edge of the bar D, thus securing the main and auxiliary tines in proper holding relation with each other, and admitting of no separation in any manner without the latch be disengaged from the recess.

The latch is secured to the shank by a holding-screw, which passes through a slot, $f$, in the latch-plate, which has a length slightly greater than the depth of the recess $e$.

G is a tripping-lever connected at one end to the spring-latch F. To the other end is attached a tripping-cord, $g$, which extends through a staple toward the handle of the fork.

This lever serves not only as a tripping-lever, for after the tripping has been effected and the hay discharged a perfect disengagement of the main tines therefrom is accomplished by a continued strain upon the tripping-cord.

It will be observed that when the latch has been moved by the lever as far as the end of the slot $f$, the bearing-strain comes direct against the holding-screw, and not on the latch-spring.

The operation may be explained as follows:

The fork is turned over, as shown in fig. 3. It will be observed that the main tines are then nearly parallel with the handle, and that, therefore, the whole device may be handled in a manner similar to handling a pitchfork, and forced into the hay to be lifted.

The handle A is then raised and carried over, which causes the auxiliary tines to bear upon the hay above the main tines.

The weight of the operator then thrown upon the handle causes the latch F to engage with the recess $e$ in the guide-bar. The fork is then ready for hoisting.

After having been elevated and swung to the desired point the tripping-line $g$ is pulled, which, by disengaging the latch from the recess, allows the hay to be discharged.

It is also practicable, if desired, to load the fork by forcing the auxiliary tines E into the hay on a line with their curve. In such case the main tines may be readily kept out of the way, either by a continued strain upon the tripping-cord $g$ or by the friction of the latch or slot in the shank against the guide-bar.

When the tines E have been sufficiently inserted the main tines could then be turned down until the latch engaged, after which the whole would be ready for hoisting.

As there is but one working-joint in the fork, and as that is in a position not likely to get clogged, it is but little liable to get out of order. The tines being all rigid, they may be made very strong at a low cost.

My fork is well adapted for use in the field with suitable portable hoisting apparatus for loading cocks upon wagons.

In handling small quantities no difficulty will be experienced. The main tines may be passed along the bottom of a cart for gathering up the loose hay, and a single armful will be retained in the fork nearly as well as if it were loaded to its capacity.

Having thus described my invention,

I claim as new and desire to secure by Letters Patent—

The improved horse hay-fork herein described, consisting of the main and auxiliary tines C and E, rigidly attached to the handle and shank, respectively, and connected by a hinged joint, the rigid holding-bar D attached to the handle, the spring sliding latch F and tripping-lever G, all constructed and operating substantially as described.

CHARLES BEAN.

Witnesses:
PHINEAS FAIRBROTHER,
M. N. DAVISON.